United States Patent [19]
Fassauer

[11] Patent Number: 5,123,235
[45] Date of Patent: Jun. 23, 1992

[54] AIR-FLOATED MULCH RECYCLE SYSTEM

[76] Inventor: Arthur L. Fassauer, P.O. Box 124, Canyon, Tex. 79015

[21] Appl. No.: 680,788

[22] Filed: Apr. 3, 1991

Related U.S. Application Data

[63] Continuation-in-part of Ser. No. 564,399, Aug. 8, 1990, abandoned, which is a continuation-in-part of Ser. No. 528,718, May 24, 1990, abandoned.

[51] Int. Cl.[5] .............................................. A01D 53/00
[52] U.S. Cl. ........................................ 56/12.9; 56/13.4
[58] Field of Search .............. 56/12.8, 12.9, 13.1–13.4, 56/320.1, 320.2

[56] References Cited

U.S. PATENT DOCUMENTS

| | | | |
|---|---|---|---|
| 3,150,479 | 9/1964 | Wolf | 56/13.4 |
| 3,908,913 | 9/1975 | Cushman | 56/12.9 X |
| 4,081,947 | 4/1978 | Szymanis | 56/13.3 |
| 4,411,125 | 10/1983 | Strickland | 56/13.4 X |
| 4,738,086 | 4/1988 | Dunn | 56/12.8 |

Primary Examiner—Thuy M. Bui
Attorney, Agent, or Firm—David H. Judson

[57] ABSTRACT

An air-floated cutting apparatus is described comprising a substantially endless housing having an open bottom, an air intake opening and a discharge port, the housing cooperating with a plate member beneath the housing to define a substantially enclosed chamber. A rotatable cutting blade is mounted in the housing, and an air impeller is provided for pressurizing air in said chamber sufficient to float the housing above the ground. The rotatable cutting blade and the air impeller are designed for co-rotation. According to the invention, a mulch recycling system is attached to the discharge port for receiving grass clippings produced by the rotatable cutting blade and for delivering the grass clippings to a predetermined location adjacent the endless housing for mulching. The system may include an applicator for treating the grass clippings with enzymes and/or bacteria to facilitate composting and fermentation.

20 Claims, 10 Drawing Sheets

AIR-FLOATED MULCH RECYCLE SYSTEM

This is a continuation-in-part of prior copending application Ser. No. 07/564,399 filed on Aug. 8, 1990, which is a continuation-in-part of prior copending application Ser. No. 07/528,718, filed on May 24, 1990, both abandoned.

TECHNICAL FIELD

The present invention relates generally to air-floated lawn mowers and the like and more particularly to an air-floated mowing apparatus and system in which cut grass clippings are recycled for mulching.

BACKGROUND OF THE INVENTION

Mulching of cut grass, clippings and vegetation has significant ecological benefits. Heretofore, it has not been possible to effectively mulch grass clippings and the like with conventional lawn mowers for several reasons. Lawn mowers typically include a predetermined number of wheels to support the mower a predetermined distance above the ground. The mower housing is typically adjustable to select the desired height of the cutting blade to effect the desired cut. The wheels make it difficult to maneuver the lawn mower around obstacles and to otherwise turn the mower. Self-propelled rotary lawn mowers remove some of the labor involved in moving the mower around the lawn, but considerable effort is still required to guide and turn such mowers It is also known in the prior art to provide wheel-less grass cutting apparatus, which have a power-operated rotary cutter and commonly-driven air impelling means for causing air to be introduced into the mower housing and directed downwards toward the ground. This operation produces a reaction force with the ground (the so-called "ground effect"), thereby supporting the mower a small distance above the ground on a cushion of air.

Prior-art "air-cushioned" lawn mowers have several disadvantages which make them difficult to use for grass cutting, let alone mulching of such cuttings. Such mowers typically have a narrow bottom surface or border in facing relationship with the ground. During operation, air blown toward the ground by the air impelling means tends to escape from the housing between the ground and the bottom surface, which substantially reduces the lifting force. The rapid escape of air along the periphery of the mower housing also stirs up dust and debris when mowing around shrubbery and the like, which makes mowing difficult and hazardous. Also, because the air is blown downward to keep the housing afloat, the air pressure depresses the grass, causing the cutting blade to leave an uneven cut. Other problems associated with prior-art air-cushioned lawn mowers include the problem of maintaining the mower on a straight cutting path and keeping the mower housing level. Further, such mowers do not an effective means to discharge grass cuttings.

It would therefore be desirable to provide a wheel-less or air-floated lawn mower that has the capability of mulching grass cuttings and that overcomes the other problems associated with prior art air-floated devices.

BRIEF SUMMARY OF THE INVENTION

It is an object of the present invention to provide an air-floated lawn mower for use in mulching grass clippings.

It is yet another object of the present invention to provide an improved air-floated apparatus having a mulch recycle system integrated therewith.

It is yet a further object of the invention to provide a mulch recovery system for an air-floated lawn mower that includes an applicator means for treating glass clippings with enzymes or bacteria to facilitate composting of the mulched clippings.

It is still another object of the invention to describe an air-floated mulch recycling system that is simple to use and reliable.

It is another object of the invention to describe an air-floated apparatus wherein a preferably frontal mulch recycling chamber cooperates with a preferably rear vacuum chamber module for providing improved operation over prior art mechanisms.

It is another object of the invention to provide a novel blade for use in an air-floated mulch recovery system that includes multiple cutting tips located at different heights.

These and other objects of the invention are provided in an air-floated cutting apparatus, comprising a substantially endless housing having an open bottom, an air intake opening and a discharge port, the housing cooperating with a plate member beneath the housing to define a substantially enclosed chamber. A rotatable cutting means is mounted in the housing, and an air impeller means is provided for pressurizing air in said chamber sufficient to float the housing above the support surface. The rotatable cutting means and the air impeller means are designed for co-rotation. According to the invention, a mulch recycling system is attached to the discharge port for receiving grass clippings produced by the rotatable cutting means and for delivering said grass clippings to a predetermined location adjacent said endless housing for mulching. The system may include an applicator for treating the grass clippings with enzymes and/or bacteria to facilitate composting and fermentation.

In accordance with a further feature of the invention, the mulch recycling system includes means for delivering the grass clippings from the discharge port of the housing to an opposite end of the housing. In this embodiment, a handle of the lawn mower is pivoted to enable the mower to be used to mulch the grass clippings. The delivery means is preferably a plastic molded or flexible tubing or the like that includes a rake module affixed to its distal end. The rack module includes spring-like tines for further dispersing the recycled clippings to ground level. This operation provides for a maximum dispersal of clippings for mulching to the soil and thus promotes rapid decay thereof.

According to another feature of the invention, the enclosed chamber of the air-floated lawn mower is formed by the plate member to define a dedicated centrifuge chamber in the housing for absolute channeling of the clippings to the discharge port. In particular, the housing has a flared extension having a lower continuous edge to which the continuous plate member is attached to form the centrifuge chamber. The chamber advantageously transports grass clippings to and through the discharge port to the mulch recycle system. The plate member advantageously includes an air entrapment boss integrally formed on an outer surface thereof for contacting the ground as the mower is floated The air entrapment boss provides a secondary lifting action by preventing pressurized air from escaping from underneath the housing. Additionally, a molded anti-stick raceway is adapted to be snapped into the centrifuge chamber for increasing the acceleration of the clippings being centrifuged. The raceway provides a positive directional channeling force to facilitate the movement of the clippings directly to the discharge port and thus out of the housing.

In an alternate embodiment of the invention, an air-floated lawn mower apparatus includes a substantially endless housing having an open bottom, the housing cooperating with a plate member beneath the housing to define a substantially enclosed chamber. Instead of a discharge port vented to atmosphere, the housing includes a mulch recycling chamber means preferably located along the frontal portion of the housing for diverting grass clippings produced by the rotatable cutting means at high pressure back into the grass surface under the chamber. The mulch recycling chamber is not directly vented to the outside of the apparatus but rather to the interior of the housing. This construction advantageously uses the air pressure used to float the housing to additionally drive the grass clippings into the ground following centrifuging. In this embodiment, a vacuum chamber means is preferably supported along a rear portion of the housing for "vacuuming" the previously cut grass clippings deposited under the housing by the mulch recycling chamber. The vacuum chamber is preferably driven by a vacuum created by the suction side of the impeller means used to float the mower. In combination, the use of mulch recycling chamber and the vacuum chamber provides significantly-enhanced mulching effects.

According to another feature of the invention, the plate member supports one or more selective positioned grass diverted modules for recycling grass cuttings into the path of the cutting blade so that the cuttings are recut to create a fine mulch.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 8 is a plan view of yet another embodiment of the cutting blade of the invention having a plurality of flexible blades formed of cable or the like:

Similar reference characters refer to similar parts throughout the several views of the drawings.

DETAILED DESCRIPTION

Figure 1:
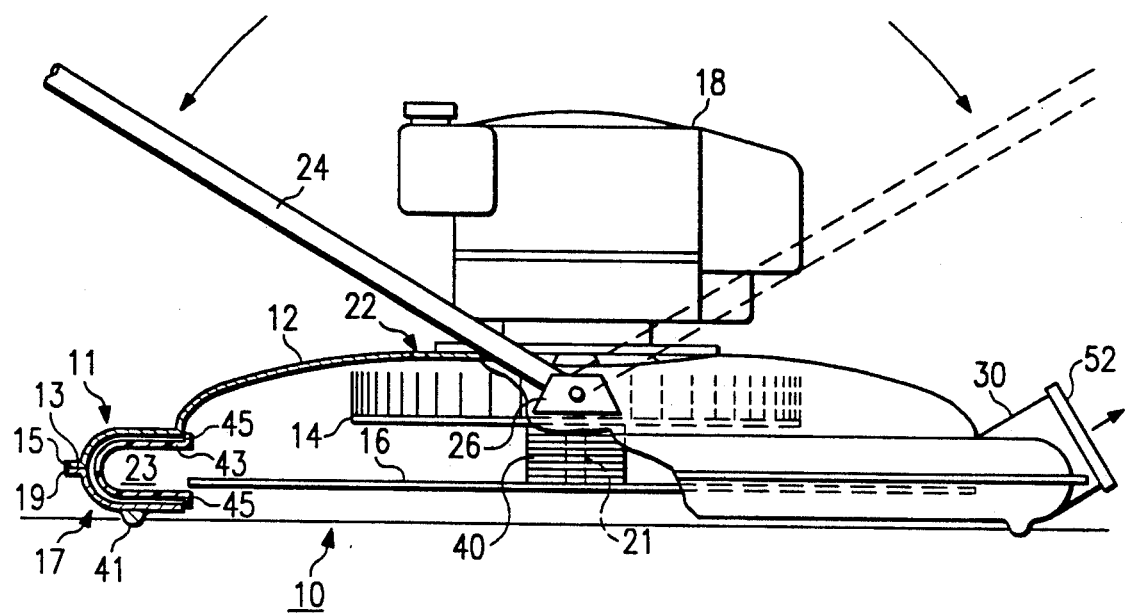
FIG. 1 is a side view, partially cutaway, of a preferred construction of an air-floated lawn mower without the mulch recycle system attached.

Referring now to FIG. 1, an air-floated lawn mower 10 includes an endless housing 12 in which a rotary air impeller 14 and a rotary cutting blade 16 are mounted for common rotation by a power source 18. Power source 18 is operatively mounted on top of housing 12 in a generally central location by conventional fastening means (not shown). Power source 18 can be an AC or DC electric motor, or, alternatively, a conventional lawn mower gasoline engine.

Housing 12 is generally trapezoidal in shape and is preferably made of plastic material formed by an injection molding process to provide a lightweight housing. Housing 12 has a plurality of air intake openings 22 located in a top part thereof and a substantially open bottom. A handle 24 is pivotally attached, as indicated at 26, to respective opposite sides of housing 12 to allow a user to control movement of the mower as will be described below. Grass cuttings are discharged from housing 12 through a rearwardly-extending discharge port or duct 30.

Air impeller 14 is preferably comprised of lightweight plastic material, and may be formed by injection molding. Cutting blade 16 is positioned below impeller 14 within housing 12, and the spacing between impeller 14 and blade 16 is adjustable by means of shims or spacers 40. The vertical position of cutting blade 16 within housing 12 determines the height of the resulting grass cut.

The housing 12 has a flared extension 11 having a lower edge 13. Edge 13 has an outwardly-extending flange 15. A Plate member 17, having a profile that is essentially a mirror-image of the housing, also includes an outwardly-extending flange 19 adapted to mate with the flange 15 of the housing lower edge. The flanges 15 and 19 are secured by means of welding or suitable fasteners to form a centrifuge chamber 23 dedicated to removing glass clippings cut by the cutting blade 16. Once the plate member is attached, the mower 10 has a substantially endless housing having an open bottom, the air intake openings and the discharge port 30. In operation, the blade 16 and the impeller 14 are adapted for co-rotation about shaft 21. Impeller 14 is configured to draw air into housing 12 through air intake openings 22 and expel the air outwardly from impeller 14 along inner surface 38 of housing 12. The air flow within housing 12 is depicted by arrows 13.

As also seen in FIG. 1, the plate member 17 includes an air entrapment boss 41 or integrally formed on or otherwise secured to an outer surface thereof for further sealing against air loss, thus promoting enhanced flotation. In particular, the air entrapment boss 41 provides a secondary lifting action by preventing pressurized air from escaping from underneath the housing. Additionally, in the preferred embodiment a molded anti-stick raceway 43 is adapted to be snapped into the centrifuge chamber 23 for increasing the acceleration of the clippings being centrifuged. The raceway is preferably coated or otherwise treated with an anti-stick coating and provides a positive directional channeling force to facilitate the movement of the clippings directly to the discharge port 30 and thus out of the housing 12. The raceway includes flanges 45 adapted to snap onto the bottom lip of the plate member and the intersection of the flared extension 11 and the major portion of the housing.

Figure 2:
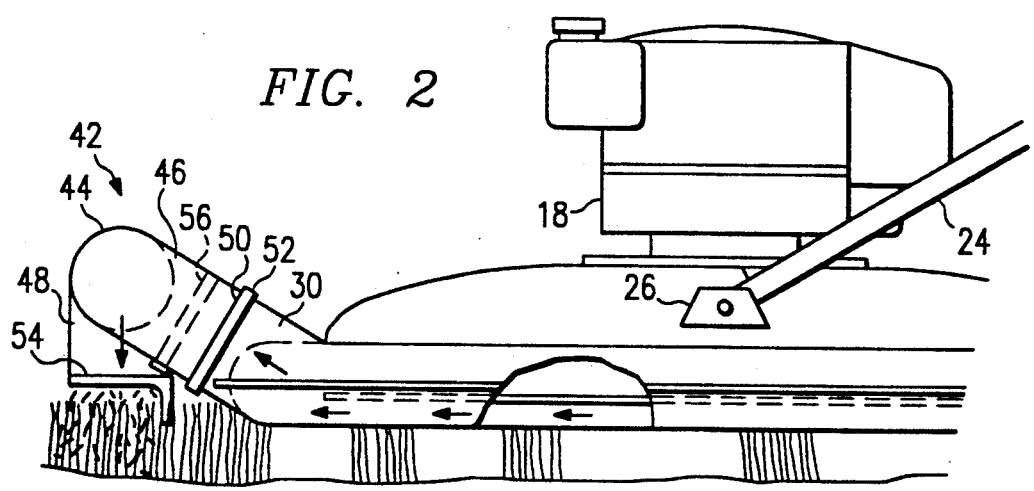
FIG. 2 is a side partial view of the air-floated lawn mower of FIG. 1 with one embodiment of the mulch recycling system attached to the grass delivery port of the mower.
Figure 4:
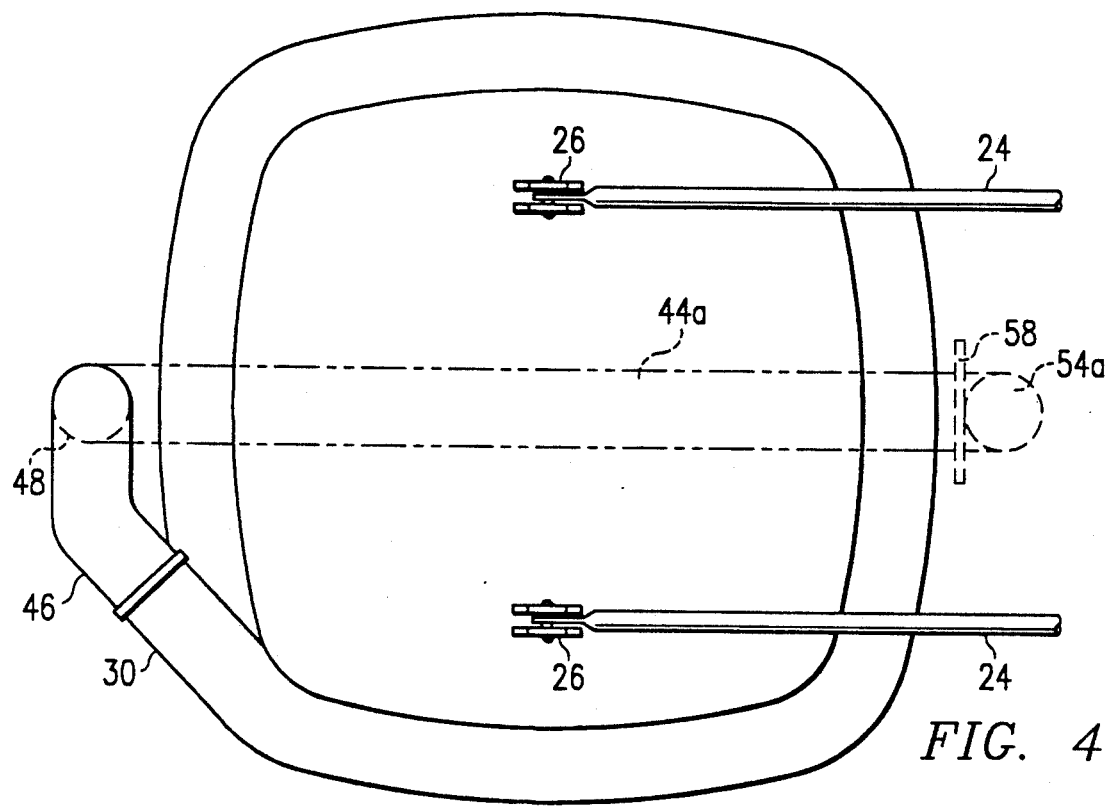
FIG. 4 is a plan view of the main housing of the lawn mower of FIG. 1 showing the alternative attachments of the mulch recycling system illustrated in FIGS. 2 and 3.

Referring now to FIGS. 2 and 4, the centrifuge chamber 23 advantageously transports grass clippings to and through the discharge port 30 to a mulch recycle system designated generally by the reference numeral 42. In this embodiment, the mulch recycle system 42 includes a preferably one-piece mulch conduit 44 having a first angled member 46 and a second downwardly-extending member 48. The conduit is preferably formed of suitable plastic material or the like. The first member 46 has an end 50 adapted to mate with a flange 52 of the discharge port. The second member is integral with the first member 46 and terminates at a port 54 located directly in front of the housing. As best seen in FIG. 2, the port 54 recycles the grass clippings, which have been cut and centrifuged out of the discharge port 30, back in front of the moving housing. This operation enables the cuttings to be recut continuously to create ultra-fine cuttings useful in mulching. Of course, if the system 42 is removed, a grass catcher (not shown) can be affixed to the discharge port 30 and the handle pivoted to enable the mower to be used in the conventional manner.

As also seen in FIG. 2, preferably the system 42 includes an applicator 56 within the conduit 44 for treating the grass clippings with enzymes and/or bacteria to facilitate composting and fermentation. The applicator can be located at any position along the conduit, or at the entrance or exit thereof, for providing the bacterial or enzyme treatment. The applicator preferably provides a liquid application to the stream of clippings to enhance such composting and fermentation. The present invention, however, is construed to cover any type of bacteria/enzyme application at the entry to, the exit of, or within the mulch delivery conduit.

Figure 3:
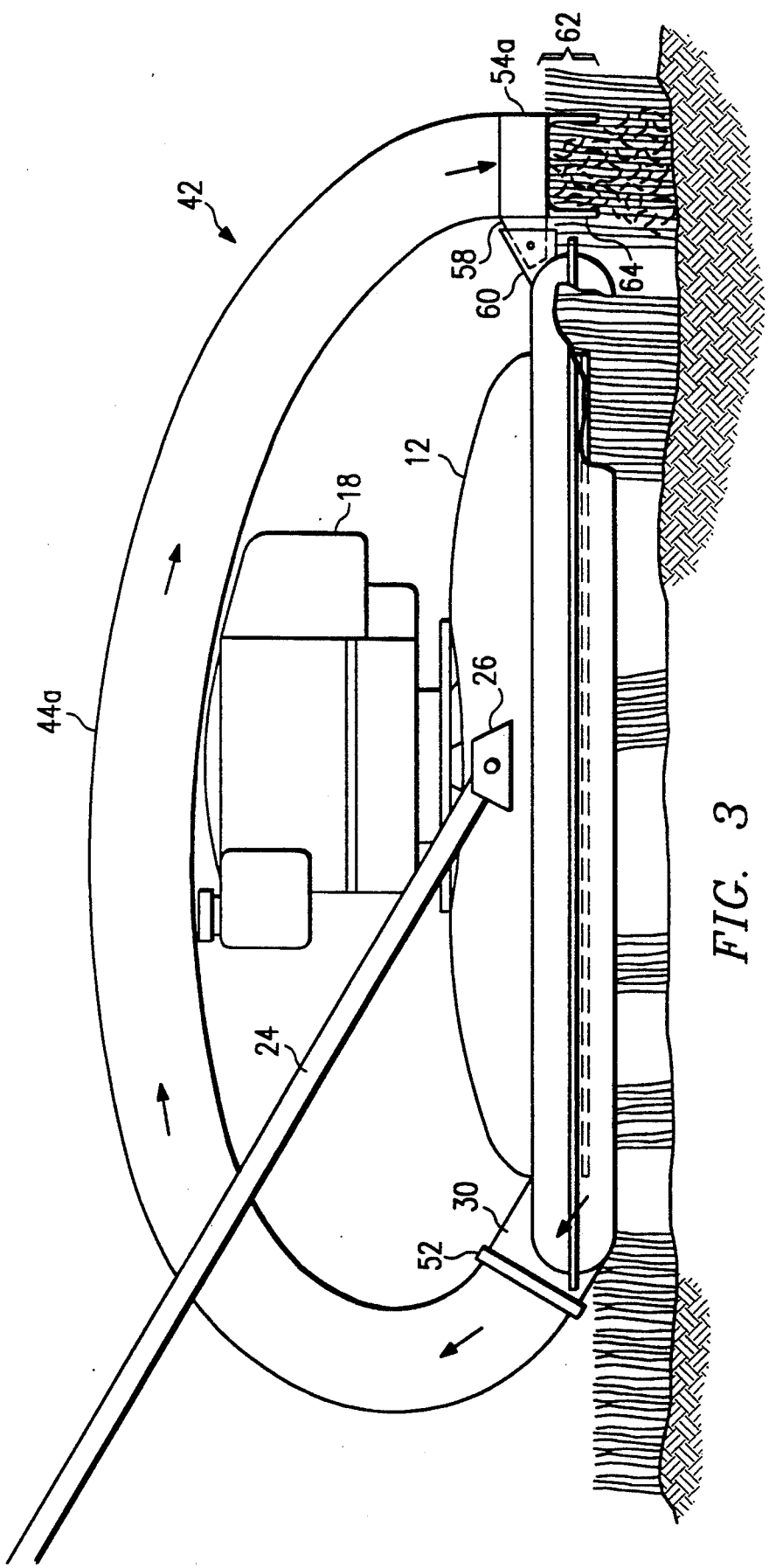
FIG. 3 is a side view of an alternate embodiment of the invention wherein the mulch recycling system delivers the grass cuttings to an opposite end of the mower according to the teachings of this invention.

In accordance with a further feature of the invention as seen in FIG. 3 and as shown in phantom in FIG. 4, the mulch recycling system 42 includes means for delivering the grass clippings from the discharge port 30 of the housing to an opposite end of the housing. In this embodiment, the handle 24 of the lawn mower 10 is pivoted over the discharge port 40 as shown. The system 42 includes a conduit 44a having a substantially semi-circular shape adapted to overlay the housing and direct the grass clippings to the opposite end of the housing. The conduit 44a also has a discharge port 54a located at its end which is secured against movement by bracket 58 attached to a support member 60 located on the housing 12. Bracket 58 also supports at its lower end a rake module 62 comprising a plurality of spring-like tines 64. The tines advantageously drive through the uncut grass as the mower is advanced for the purpose of vibrating or disturbing the uncut grass. This operation enhances the disbursement of the grass clippings from the recycle system 42. Of course, the rake module 62 can also be provided in the mulch recycle system of FIG. 2.

Figure 5:
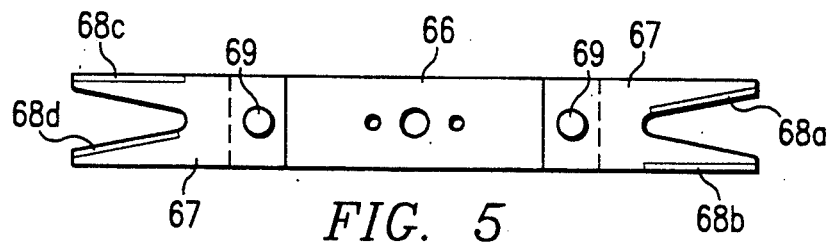
FIG. 5 is, a plan view of one type of cutting blade used in the air-floated lawn mower of FIG. 1.

Referring now to FIG. 5, one embodiment of the cutting blade 16 is shown. The blade 16 includes a base 66 having two swivel blades 67 removably secured thereto by fasteners 69. Each blade is adapted to swivel about a fastener 69; alternatively, the blades 67 can be fixed to the base to form an integral blade. A plurality of cutting tips 68 are arranged on the blades 67. A first pair comprises tips 68a and 68b, while a second pair comprises tips 68c and 68d. Preferably, tip 68a is crimped and thus extends from the base at a different horizontal position as compared to the tip 68b ; likewise, tip 68c is crimped and thus extends at a different position as compared to tip 68d. Preferably, each cutting tip 68 is located at a different "stepped" position, with each tip cutting at a different depth or cutting level of approximately $\frac{1}{8}$-$\frac{3}{8}$ inch. This construction provides a stepped cutting arrangement as the cutting blade is rotated.

Such stepped cutting provides extremely-fine grass clippings to facilitate the mulching operation.

Figure 6:
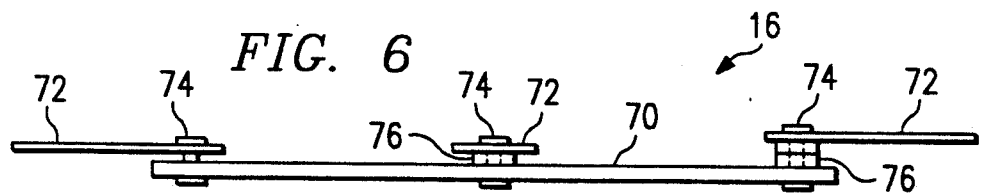
FIG. 6 is a side view of an alternate embodiment of the cutting blade having a plurality of swivel cutting blades located at predetermined stepped positions.
Figure 7:
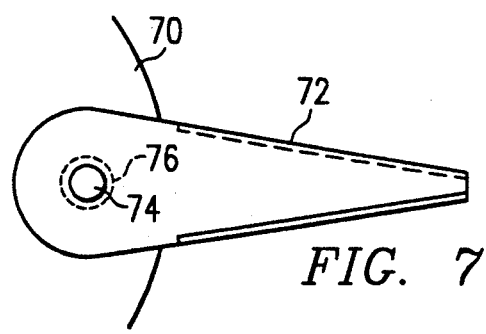
FIG. 7 is a plan view of one of the swivel cutting blades of FIG. 6.

An first alternate embodiment of the cutting blade is shown in detail in FIGS. 6–7. In this embodiment, the cutting blade 16 comprises a substantially-circular base 70 having a plurality of swivel blades 72 attached to the periphery thereof by suitable fasteners 74. In particular, each blade 72 is mounted for swivel movement about the fastener 74 as the base 70 is rotated. As best seen in FIGURE 6, preferably one or more of the blades 72 is mounted at a different vertical position from the other blades. The stepped mounting of the blades can be accomplished using shims or spacers 76. Each of the blades is formed of metal, plastic, or some other flexible material.

Figure 8:
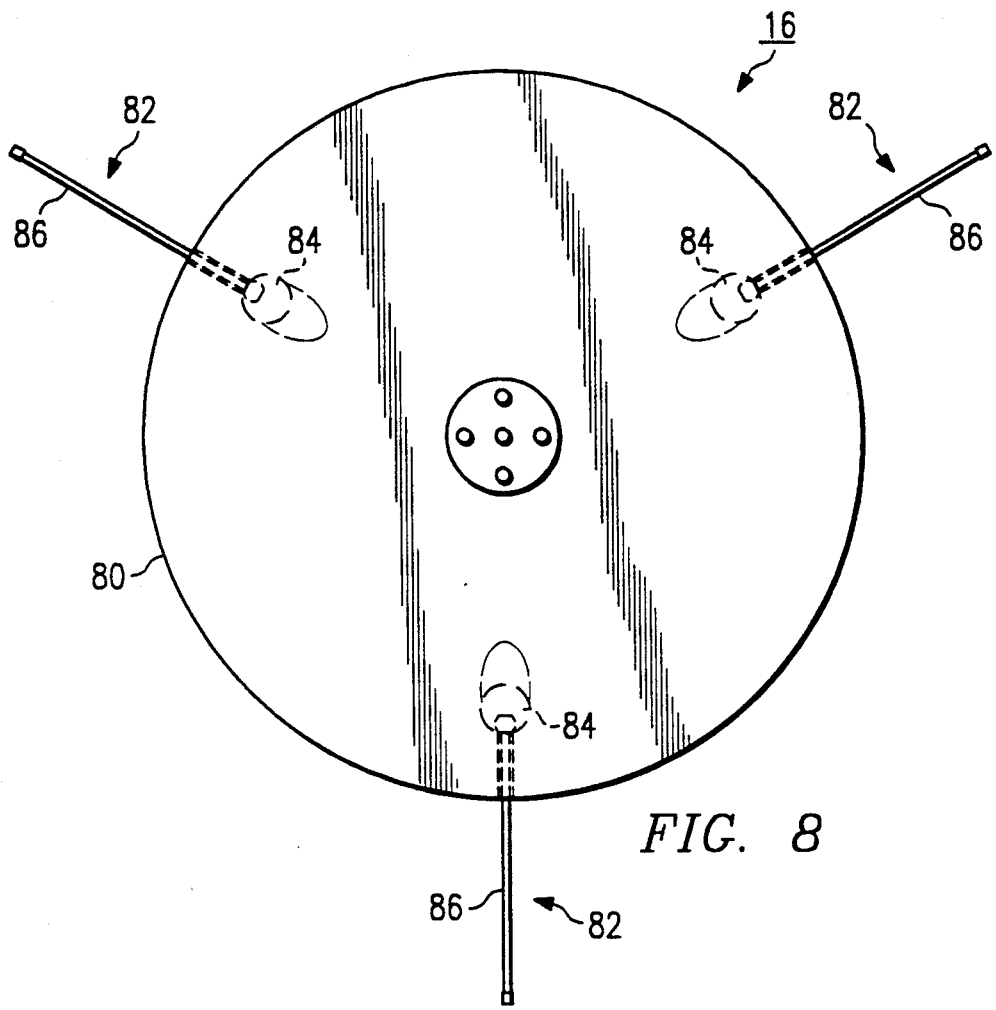
Figure 9:
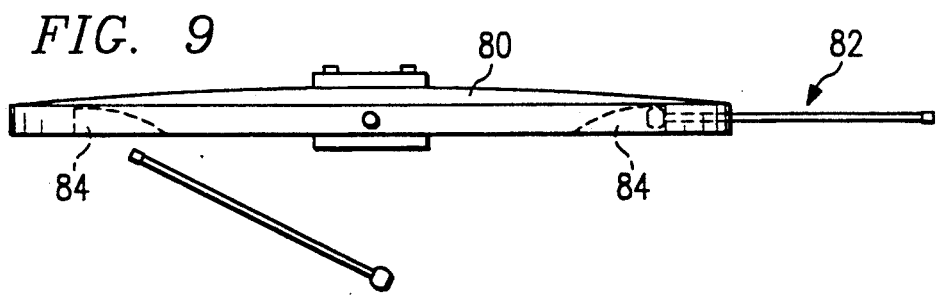
FIG. 9 is an elevational view of the cutting blade of FIG. 8 showing how the flexible cable blade is installed.
Figure 10:
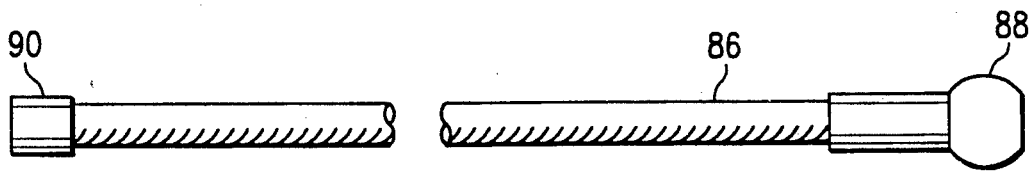
FIG. 10 is a side view of a preferred construction of one of the cable blade elements of the cutting blade of FIG. 8.

A second alternate embodiment of the cutting blade is shown in detail in FIGS. 8–10. In this embodiment, the cutting blade 16 comprises a substantially-circular base 80 having a plurality of flexible blades 82 drawn threw access ports 84 as best seen in FIG. 9. Each of the blades is shown in FIG. 10 and preferably comprises a length of aircraft cable or the like 86. One end of the cable 86 is crimped with a steel ball terminal 88 adapted to be maintained in the access port 84. The opposite end of the cable 86 is crimped by a steel cutting edge 90 that prevents the cable from fraying and acts as the primary cutting edge. Steel cutting edge 90 increases the useful life of the edge. Although not shown in detail, each access port 84 can be placed at a different horizontal position to generate a stepped cutting profile as the blade 16 rotates.

Therefore, according to the preferred embodiment of the invention, the air-floated lawn mower includes an improved cutting blade mechanism wherein either a stepped arrangement of cutting teeth or a plurality of flexible cable-like blades are provided to enhance the cutting action. The resulting grass clippings are then centrifuged out of the housing through a dedicated centrifuge chamber to a discharge port. A mulch recycle system delivers the grass clippings to a predetermined location adjacent the housing as the mower is advanced. This operation provides effective mulching of the grass clippings in an manner that is neither disclosed nor suggested by the prior art.

The novel mulching system described above is advantageous in that the grass clippings are centrifuged from a given delivery port preferably to the frontal area of the cutting apparatus whereby the delivery of the clippings occurs with air pressure in the mowing directional path into the open atmosphere. The delivery port is approximately level with the uncut grass, allowing the clippings to be directed down and through the uncut grass in the open atmosphere. The forward motion allows for a recycling recut of the clippings as well as the disturbance of the grass being cut, whereby the recycled clippings are driven in and through the grass being cut creating a very fine cut of grass clippings to facilitate the composting thereof, thus promoting rapid decay.

Figure 11:
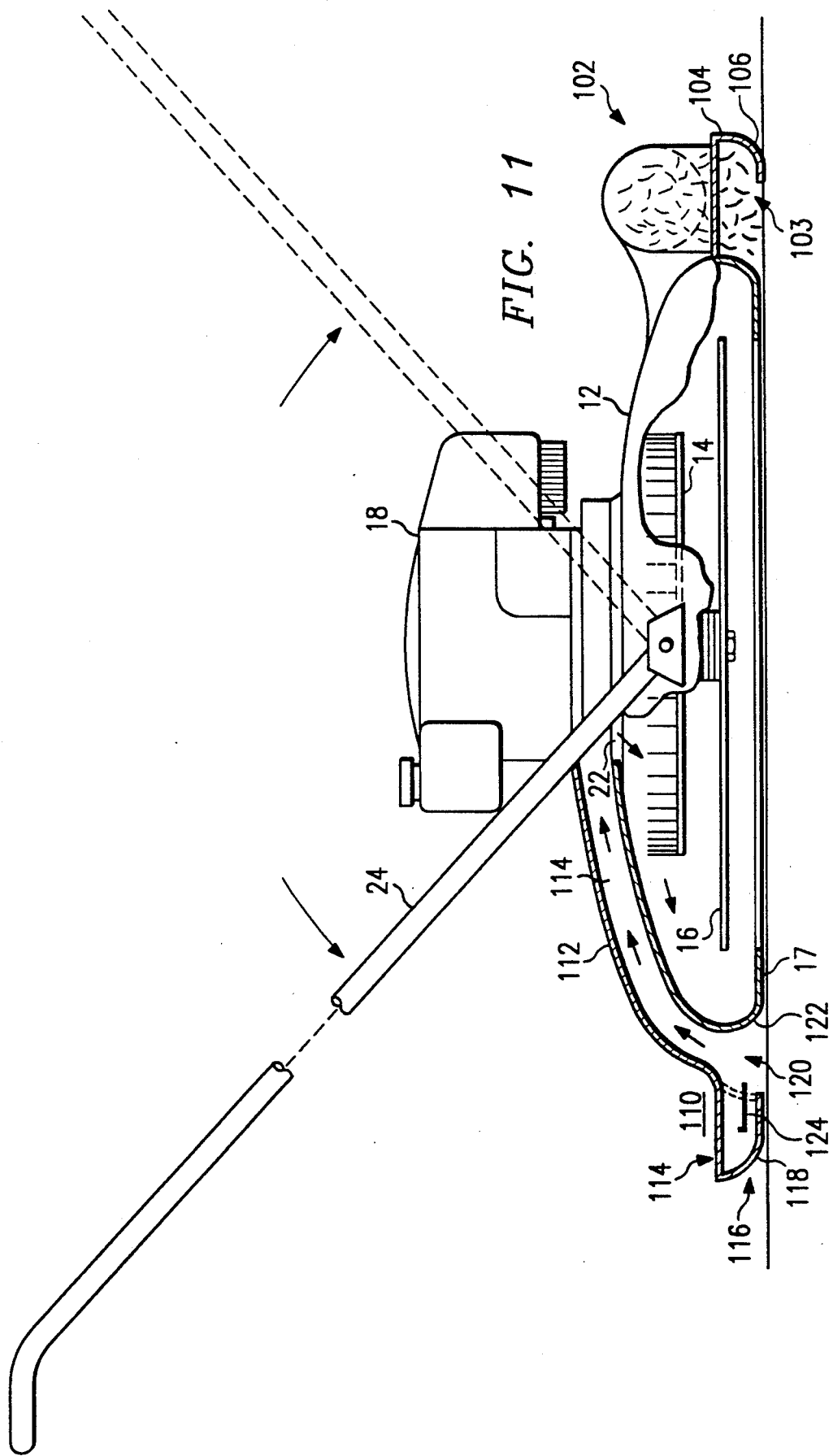
FIG. 11 is a side view of an alternate embodiment of the invention wherein the air-floated lawn mower includes a frontal mulch recycling chamber and a rear vacuum chamber.
Figure 12:
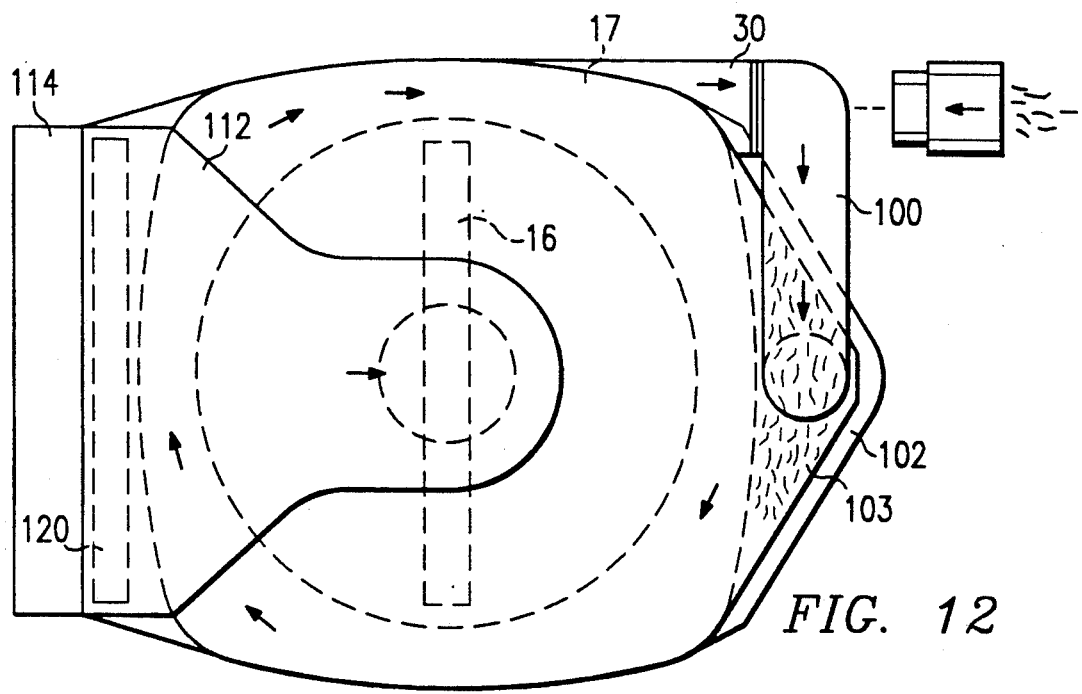
FIG. 12 is a plan view of the air-floated lawn mower of FIG. 11.

In an alternate embodiment of the invention, an air-floated lawn mower apparatus includes a frontal mulch recycling system and a rear vacuum chamber module as shown in FIGS. 11–20. Referring to FIGS. 11–12, which are side and plan views respectively of one embodiment, the mower includes the housing 12 having an integral plate member 17 to form a substantially endless housing having an open bottom. As best seen in FIG. 12, the discharge port 30 of the housing 12 is not connected directly to the outside atmosphere as described above, rather, the port receives a conduit 100 which, in turn, directs the cut grass clippings into a frontal mulch recycling module 102 having a chamber 103. As seen in FIG. 11, the mulch recycling module 102 includes a rounded leading edge 104 which presents a curved profile 106 to the grass surface, thereby promoting the gliding action of the mower and serving to effectively seal pressurized air within the recycling chamber 103. By effectively sealing the mulch recycling chamber 103 from the outside atmosphere, and by connecting this chamber to the pressurized air used to float the apparatus and to centrifuge the cut clippings, an enhanced cut is provided as the mower is advanced.

Such improved results are even more significant when the frontal mulch recycling module 102 is combined with a preferably rear-supported vacuum chamber means 110 as seen in FIGS. 11-12. Although vacuum chamber means 110 is not required, it is preferred. Vacuum chamber means is formed through the addition of a triangular-shaped shroud 112 which, together with the rear portion of the housing 12, forms a chamber 114 connected with air intake openings 22 to the vacuum side of the impeller 14. The vacuum chamber means 110 includes a rear deck 114 having a rounded trailing edge 116 which presents a curved profile 118 to the grass surface. The trailing edge 116 terminates along a vacuum slot 120 between the edge and a rounded portion 122 of the housing 12. The rear deck 114 supports an adjustable sliding plate 124 which is movable to change the width of the vacuum slot 120 when it is desired to adjust the vacuum pressure.

The lawn mower apparatus of FIGS. 11-12 has significant advantages. In operation, the frontal mulch recycling chamber diverts grass clippings produced by the rotatable cutting blade 16 at high pressure back into the grass surface under the chamber. The mulch recycling chamber is not directly vented to the air outside the apparatus but rather to the interior of the housing. This construction advantageously uses the air pressure used to float the housing to additionally drive the grass clippings into the ground after centrifuging. Most of the cut grass clippings are dispersed into the soil level; any remaining clippings (which should be a small percentage) can then be cleaned up using the vacuum module for subsequent recycle and recut. In particular, the vacuum chamber advantageously "vacuums" the previously cut remaining grass clippings deposited under the housing by the mulch recycling chamber but not otherwise dispersed into the soil. The vacuum chamber is preferably driven by a vacuum created by the impeller 14 used to float the mower, although a separate small impeller should also be used. In combination, the use of mulch recycling chamber and the vacuum chamber provides significantly-enhanced mulching effects as the mower is advanced in a forward direction.

It should be appreciated that the frontal mulch recycling chamber thus encapsulates and maintains significant air pressure to substantially prevent air leakage from the housing 12. This chamber is preferably attached or molded to the housing, thus promoting a maximum lift. By minimizing escape of air from the housing, the frontal mulch recycling chamber maximizes the air pressures used to disperse the grass clippings in the uncut grass through and into the soil area to promote composting and decay. Any grass clippings that have not been dispersed in the soil area are thus vacuumed by the vacuum chamber, recycled and recut by blade 16 after being drawn through the air intake openings 22. The vacuum source thus promotes minute clean-up of any clippings that are trailed from the frontal mulching system.

Figure 13:
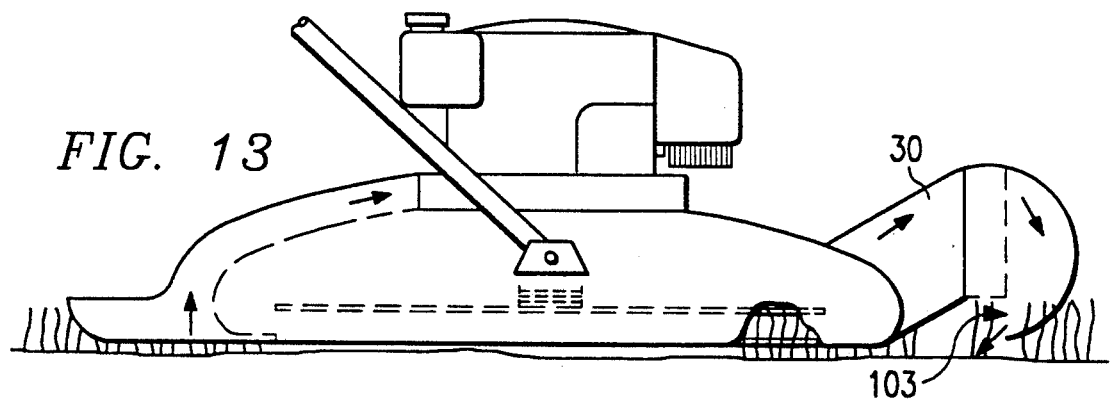
FIG. 13 is a side view of yet another embodiment of the invention including a modified form of the mulch recycling chamber.
Figure 14:
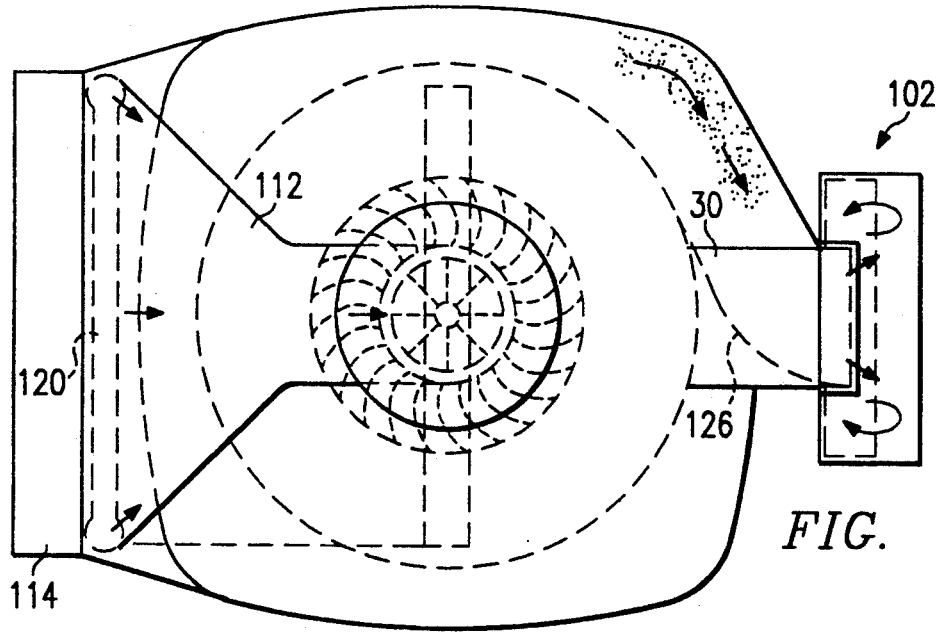
FIG. 14 is a plan view of the air-floated mower of FIG. 13.

Numerous alternative structures for the frontal mulch recycling chamber are envisioned by the present invention without departing from the spirit thereof. FIGS. 13-14 show side and plan views, respectively, of one such embodiment wherein the frontal mulch recycling module 102 is attached to a center delivery discharge port 30. The module 102 can, of course, be removed to facilitate the attachment of a grass catching bag if the handle 24 is pivoted over the housing as described above. As best seen in the plan view of FIG. 14, a diverting baffle 126 is located within the housing 12 to guide the grass clippings through the centerline-located discharge port 30, into the mulching module 102 and down into the grass surface.

Figure 15:
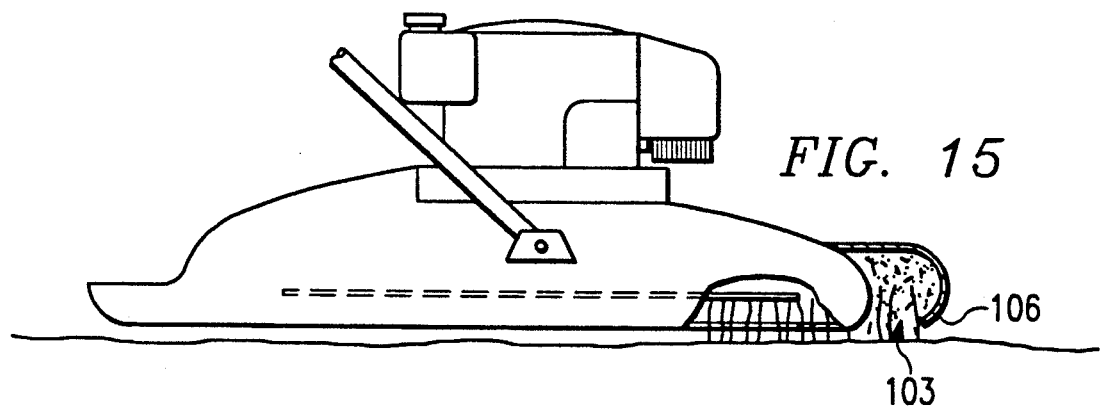
FIG. 15 is a side view of the preferred embodiment of the invention incorporating a frontal mulch recycling chamber and a rear vacuum chamber.
Figure 16:
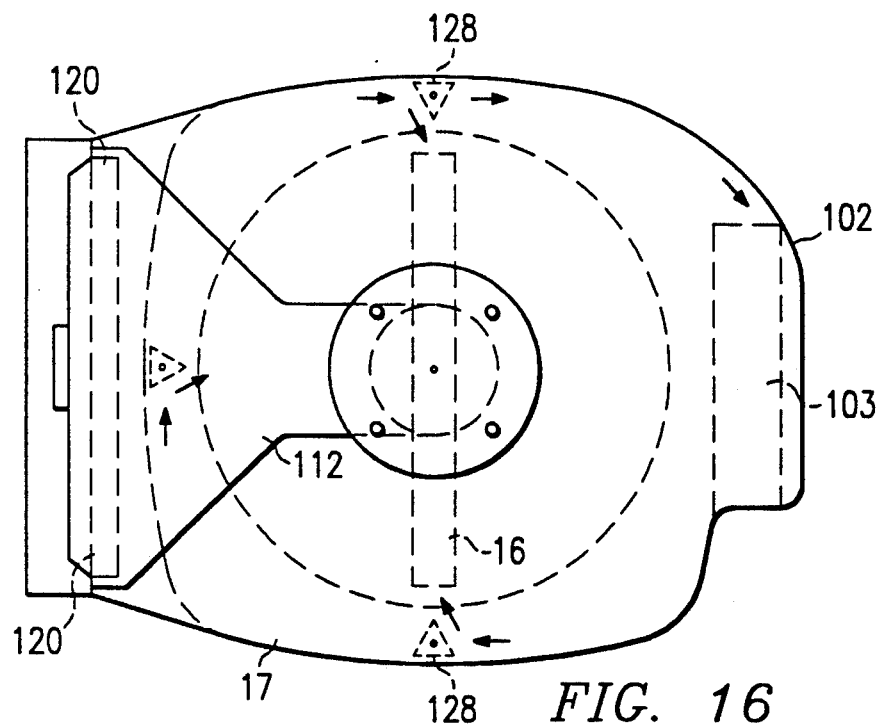
FIG. 16 is a plan view of the air-floated apparatus of FIG. 15.

FIGS. 15-16 show side and plan views, respectively, of a preferred embodiment of the invention wherein the frontal mulch recycling module 102 is integrally-formed as an extension of the housing 12. As seen in FIG. 16, in this embodiment the plate member 17 also supports (through suitable attachment means) one or more substantially triangular-shaped diverter barriers 128 selectively positioned at predetermined positions along the outer diameter of the plate member 17 for diverting grass clippings back into the path of the blade member 16. Following such recutting and centrifuging, these clippings are extremely fine. They are then diverted to the mulch recycling module 102 having the chamber 103 as described above. Mulch recycling module 102 has a rounded outer facing profile to facilitate gliding of the mower through the grass. The chamber 103 disperses the ultrafine clippings into the soil area at great pressure, thus contributing to the penetration of these clippings in and through the uncut grass and into the ground for eventual decomposition and decay.

Figure 17:
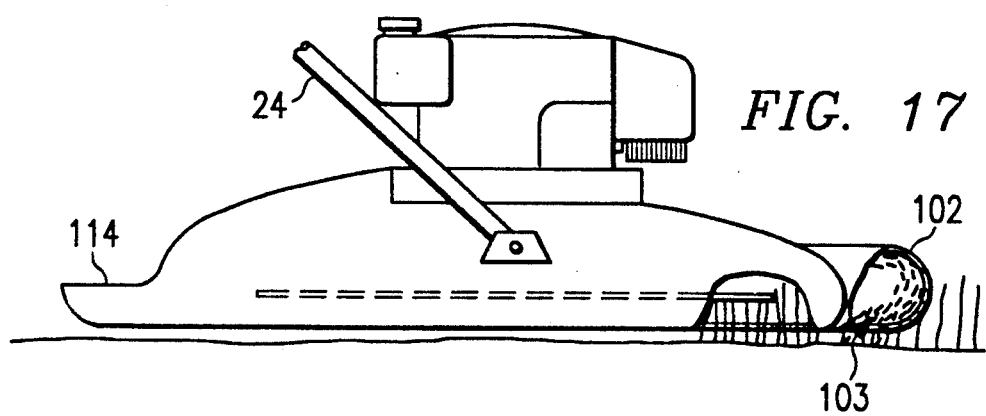
FIG. 17 is a side view of yet another embodiment of the invention including a modified form of the mulch recycling chamber.
Figure 18:
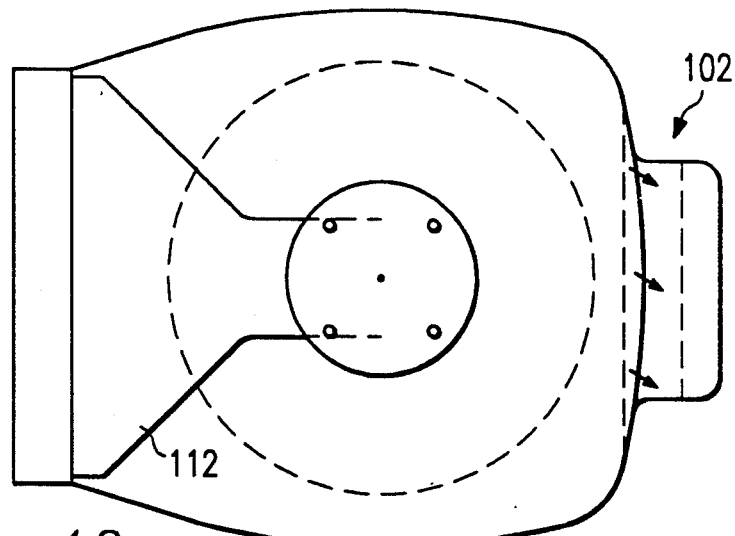
FIG. 18 is a plan view of the air-floated mower of FIG. 17.

FIGS. 17-18 show side and plan views, respectively, of yet another preferred embodiment of the invention wherein the mulch recycling module 102 is again centrally-located along the frontal portion of the housing 12. This structure differs from that of FIGS. 13-14 because the discharge port 30 is omitted and the module 102 is formed as an extension of the housing substantially as shown.

Figure 19:
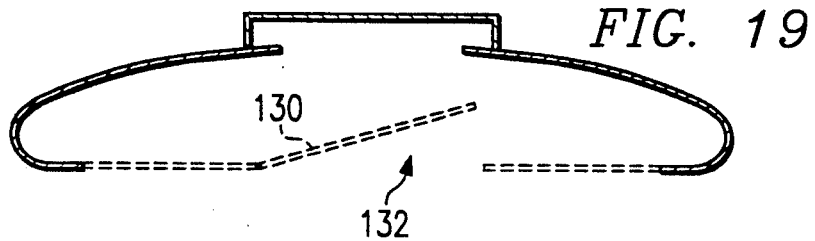
FIG. 19 is a side view of still another embodiment of the invention incorporating a frontal mulch recycling chamber formed within the frontal portion of the housing itself.
Figure 20:
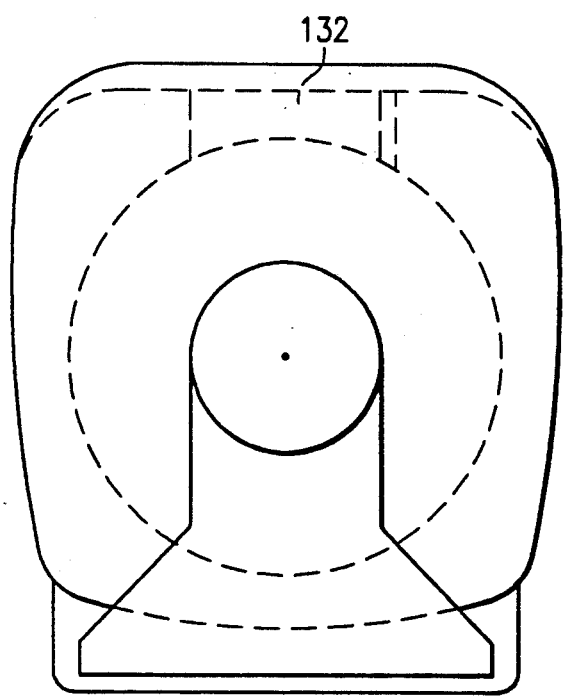
FIG. 20 is a plan view of the air-floated apparatus of FIG. 19.

FIGS. 19-20 show side and plan view, respectively, of another embodiment wherein the frontal mulch recycling chamber is merely positioned within the existing housing 12 (i.e., with no extension thereof). The module 102 then comprises the diverting baffle 130 which serves to forcefully divert the cut grass clippings through a slot 132 in the plate member 17. This construction is simple and inexpensive to manufacture but still preserves the basic operating principles of the invention.

Although not discussed in detail, it should be appreciated that the various air-floated apparatus of FIGS. 13-20 may include the vacuum chamber module described above.

Figure 21:
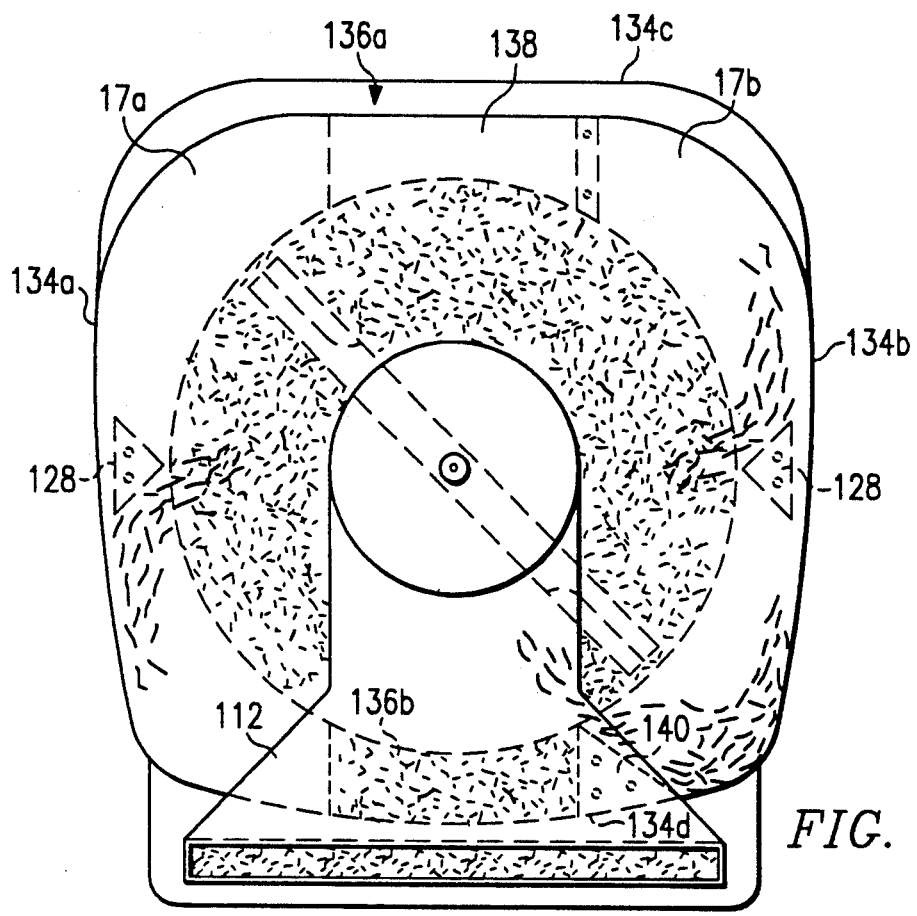
FIG. 21 is a plan view, partially cutaway, of yet another alternate embodiment of the air-floated apparatus of the invention.
Figure 21A:
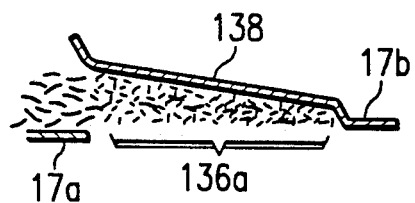
FIG. 21A is a side view of the diverter baffle of the apparatus of FIG. 21.

Yet another embodiment of the invention is shown in plan view in FIG. 21. As in the embodiment of FIG. 11, a vacuum chamber means is formed through the use of a triangular-shaped shroud 112. This apparatus differs from the previous embodiments in that the plate member 17 now includes first and second symmetrical members 17a and 17b which are located along the side portions 134a and 134b of the housing, respectively. Each of the members 17a and 17b is semi-circular is shape and supports one of triangular-shaped barriers 128 as previously described. The members 17a and 17b are separated by the space 136a, located adjacent the frontal portion 134c of the housing, and by the space 136b, located adjacent the rear portion 134d of the housing but in front of the vacuuming slot. As best seen in FIG. 21A, the frontal space 136a is actually a discharge port for the apparatus. In particular, and like FIG. 19, a diverter baffle 138 is attached to the plate member 17b and presents an upwardly-directed profile into the centrifuge chamber. The cut grass clippings, which have been recut by virtue of being diverted back into the path of the cutting blade by the diverter barriers 128, are eventually transported around the centrifuge chamber and forced against the diverter baffle 138, whereupon they are forcefully discharged into the ground through the space 136a. Thereafter, as the apparatus is advanced in a forward direction, the vacuum module can be used to vacuum any remaining clippings as previously disclosed. Alternatively, the clippings can be left on the ground for composting or collecting in a bag.

Figure 21B:
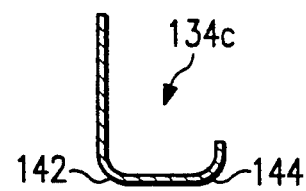
FIG. 21B is a side view of the frontal portion of the housing of the apparatus of FIG. 21.

As also seen in FIG. 21, the plate member 17b supports a barrier 140 adjacent the space 136b to recycle the cuttings back into the path of the cutting blade. Of course, the space 136b alternatively can be filled (by connecting the rear portions of the plate member 17a and 17b, in which case the barrier 140 could, but ned not, be omitted. Moreover, as shown in FIG. 21B, the frontal portion 134c of the housing includes rounded inner and outer edges 142 and 144 to facilitate movement of the apparatus on the air cushion created by the impeller.

Figure 22:
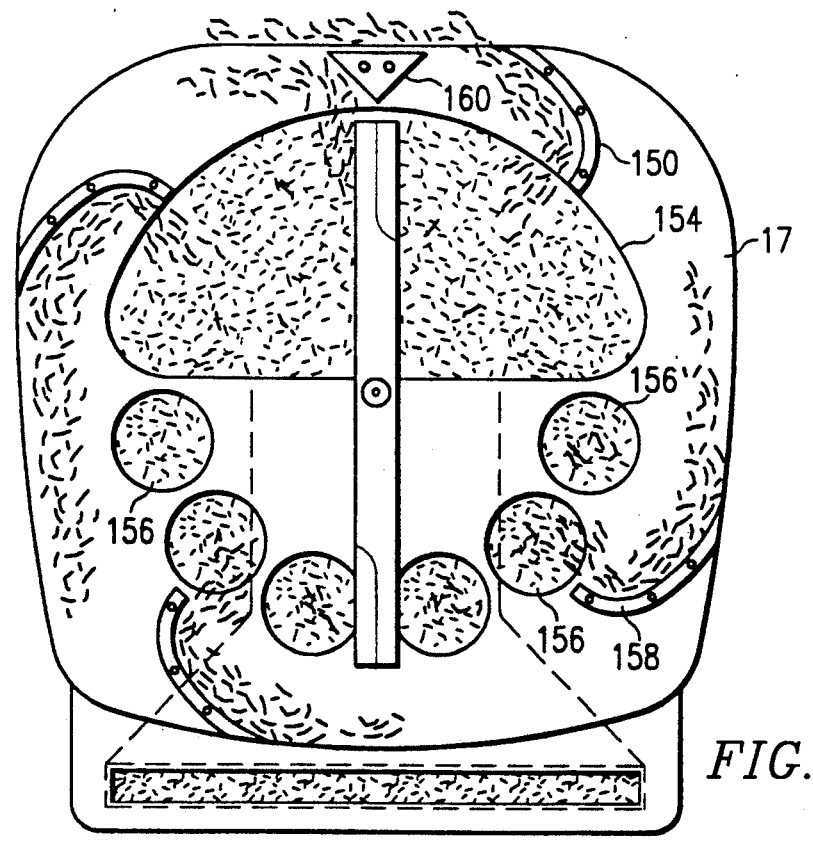
FIG. 22 is a plan view, partially cutaway, of another the air-floated mower construction.

FIG. 22 shows another embodiment of the invention wherein the plate member 17 includes a modified structure. The plate member has an semicircular-shaped opening 154 extending along an arc of approximately 180 degrees in a first portion thereof. The plate also includes a plurality of circular openings 156, the respective centers of which lie along an arc of approximately 180 degrees, located in a second predetermined portion thereof. The plate member further supports (by suitable attachment means) a plurality of curved barrier diverters 158 selectively-positioned around the periphery of the housing for diverting the cut grass clippings back into the path of the cutting blade. A triangular-shaped barrier 160 is also preferably supported on the plate member adjacent the frontal portion of the housing. After the cuttings have been recycled into the blade, eventually they will be discharged through the opening 154 and returned back into the ground. A vacuum module can also be supported on the apparatus for vacuuming if desired. Although not shown in detail, the barrier 160 may be replaced with a spiral-shaped diverter to deliver the cut clippings downwardly and into the soil area for recycling and recut thereof.

Figure 23A:
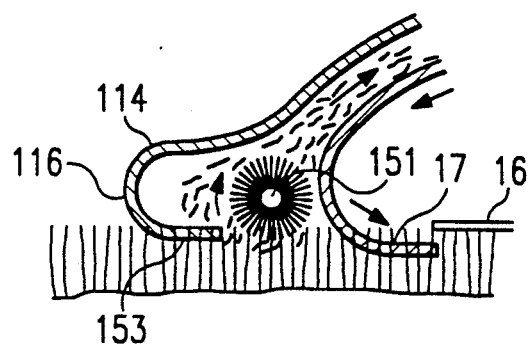
FIG. 23A is a detailed view of a portion of FIG. 23 showing the vertical spacing of the bristle brush supported in the vacuum module.
Figure 23:
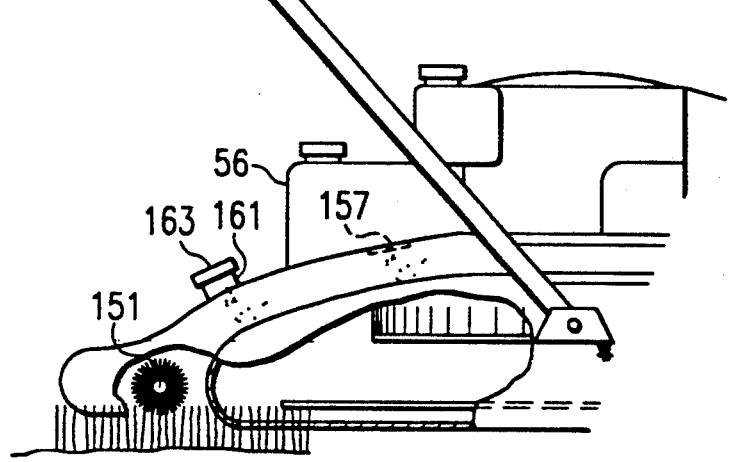
FIG. 23 is a side view, partially cutaway, of a modified form of the lawn mower of FIG. 11 including several additional features according to the invention.

Referring now to FIG. 23, in an alternate embodiment of FIG. 11, the vacuum module means includes a separate motor means for driving one or more auger-type brushes 151 or times to stir-up the cut and recycled grass clippings and thus enhance the vacuuming operation. The brush 151 is preferably of the bristle-type and is located just above the vacuum slot. In particular, and as best seen in FIG. 23A, the vacuum module means includes the rear deck 114 having the rounded trailing edge 116 and the bottom plate 153. The bottom plate 153 of the vacuum module is elevated slightly with respect to the main plate member 17 of the mower, and the bristle brush 151 is located substantially as shown. This construction advantageously enables the rear-mounted vacuum chamber to be used in a cleanup mode for any of the previously cut grass clippings 155 which have not been forcefully thrown into the ground by the frontal mulch recycling module. The bristle brush is rotated in a clockwise direction and penetrates a small distance (approximately ⅛") into the cut grass clippings 155 thereby allowing the brush 155 to maintain a constant contact with the grass and thus act as a self-propelled drive means for the mower. In particular, due to the constant contact between the brush and the clippings, (and the non-frictional gliding of the mower), the clockwise rotation of the brush promotes advancement of the hovering mower in a straight swath while simultaneously vacuuming the clippings as previously described.

As also seen in FIG. 23, the air-floated apparatus may support the fertilizer or enzyme applicator 56 on the housing itself or on the shroud that forms the vacuum chamber. In this embodiment, an orifice 157 interconnects the applicator 56 to the vacuum chamber 114. The orifice 157 includes an adjustable valve to enable injection of the material into the vacuum stream; alternatively, the vacuum force itself (created by the impeller) is used to suction the material through the orifice 157 and into the vacuum chamber. The applicator will also include an air inlet on the cap thereof. In either case, the material is supplied to the recycled clippings.

Additionally, the lawn mower preferably includes a vacuum clean-out 161 including a threaded removable cap 163. Upon removal of the cap, a water hose can be placed in or connected to the clean-out while the impeller is rotating. The vacuum force created by the impeller suctions the water into the interior of the housing and throws the water forcibly outward within the centrifuge chamber to effect a thorough clean-out of the impeller, the blade and the rest of the housing. This feature is especially advantageous and safe because it enables the mower to be cleaned without turning the housing over to access the blade.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. An air-floated apparatus for simultaneously cutting and mulching grass as the apparatus is advanced in a forward direction, comprising:
a housing having an open bottom, an air intake opening and a discharge port, said housing having a frontal potion and cooperating with a plate member beneath said housing to define a substantially enclosed centrifuge chamber;
a motor including a rotatable shaft;
a rotatable cutting blade mounted on the shaft for generating grass clippings and for throwing the grass clippings outwards into the centrifuge chamber as the blade rotates, and wherein the centrifuge chamber transports the grass clippings to the discharge port;
means for establishing a cushion of pressurized air to float the housing above a support surface; and
recycle means attached to the discharge port for receiving and delivering the grass clippings to the forward portion of the housing such that the grass clippings are delivered into the support surface as the apparatus is advanced in the forward direction.

2. An air-floated cutting apparatus, comprising:
a substantially endless housing having an open bottom, an air intake opening and a discharge port, said housing cooperating with a plate member beneath said housing to define a substantially enclosed centrifuge chamber;
rotatable cutting means mounted in the housing;
means for pressurizing air in said housing sufficient to float the housing above the support surface;
recycle means attached to the discharge port for receiving grass clippings produced by the rotatable cutting means and delivering said grass clippings to a predetermined location adjacent said endless housing for mulching, the recycle means including applicator means for treating the grass clippings to facilitate composting and fermentation thereof following delivery to the support surface.

3. The air-floated cutting apparatus as described in claim 2 wherein the discharge port is located at an end portion of the apparatus.

4. The air-floated cutting apparatus as described in claim 3 further including handle means and means to pivot the handle toward the end portion of the apparatus.

5. The air-floated cutting apparatus as described in claim 4 wherein the recycle means includes means for transporting grass clippings to an opposite end portion of the apparatus.

6. The air-floated cutting apparatus as described in claim 2 wherein the recycle means includes a rake module for facilitating disbursement of the grass clippings at the predetermined location.

7. The air-floated cutting apparatus as described in claim 6 wherein the rake module includes a plurality of spring-like tines.

8. The air-floated cutting apparatus as described in claim 2 wherein the rotatable cutting means comprises a support plate, and a plurality of cutting blades each mounted for swivel movement on the support plate as the support plate is rotated.

9. The air-floated cutting apparatus as described in claim 8 wherein at least one of the cutting blades is mounted at a different horizontal position than a remainder of the plurality of cutting blades.

10. The air-floated cutting apparatus as described in claim 2 further including means supported in the centrifuge chamber for accelerating movement of the grass clippings within the centrifuge chamber.

11. The air-floated cutting apparatus as described in claim 2 wherein the plate member includes an air entrapment boss on its outer peripheral surface for contacting the support surface when the apparatus is floated to prevent pressurized air from escaping from underneath the housing.

12. An air-floated cutting apparatus, comprising:
a substantially endless housing having an open bottom, and an air intake opening, said housing cooperating with a plate member beneath said housing to define a substantially enclosed centrifuge chamber;
a motor including a rotatable shaft;
a rotatable cutting blade mounted on the shaft for generating grass clippings and for throwing the grass clippings outwards into the centrifuge chamber as the blade rotates;

means for establishing a cushion of pressurized air to float the housing above a support surface; and recycling means in communication with the centrifuge chamber for receiving and delivering said grass clippings into the support surface.

13. The air-floated cutting apparatus as described in claim 12 further including vacuum module means including a vacuum chamber, the vacuum module means operably coupled to a vacuum side of the means for establishing a cushion of pressurized air for vacuuming any grass clippings that are not delivered into the support surface.

14. The air-floated cutting apparatus as described in claim 13 further including applicator means in communication with the vacuum chamber for treating the grass clippings.

15. The air-floated cutting apparatus as described in claim 13 further including clean-out means in communication with the vacuum chamber to facilitate cleaning of the impeller.

16. The cutting apparatus as described in claim 13 wherein the vacuum module means further includes an agitator brush and means for rotating the agitator brush to self-propel the housing during flotation.

17. The air-floated cutting apparatus as described in claim 12 wherein the recycling means includes a rounded leading edge which presents a curved profile to the support surface.

18. The air-floated cutting apparatus as described in claim 12 wherein the recycling means includes a diverting baffle to facilitate delivery of the grass clippings from the housing.

19. The air-floated cutting apparatus as described in claim 12 wherein the plate member supports one or more barriers located along an outer diameter thereof for diverting grass clippings back into a path of the cutting blade.

20. The air-floated cutting apparatus as described in claim 12 wherein the rotatable cutting means comprises a support plate, and a plurality of cutting blades each mounted for swivel movement on the support plate as the support plate is rotated.

* * * * *